(12) United States Patent
Lam et al.

(10) Patent No.: US 8,731,338 B1
(45) Date of Patent: May 20, 2014

(54) IMAGE DOWNSCALING

(75) Inventors: Hin-Chung Lam, Kirkland, WA (US); Anthony C. Gentilcore, London (GB); Sami Kyostila, London (GB)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/412,551

(22) Filed: Mar. 5, 2012

Related U.S. Application Data

(60) Provisional application No. 61/570,268, filed on Dec. 13, 2011.

(51) Int. Cl.
*G06K 9/32* (2006.01)
*G06K 9/36* (2006.01)
*G06K 9/46* (2006.01)

(52) U.S. Cl.
USPC .......................................... 382/300; 382/233

(58) Field of Classification Search
USPC ......... 382/162, 164, 173, 228, 232, 233, 275, 382/277, 294, 298–300; 375/240.16
See application file for complete search history.

(56) References Cited

U.S. PATENT DOCUMENTS

| | | | | |
|---|---|---|---|---|
| 7,623,574 B2* | 11/2009 | Holcomb | ................ | 375/240.16 |
| 7,941,004 B2* | 5/2011 | Zhu et al. | ...................... | 382/299 |
| 8,009,921 B2* | 8/2011 | Csurka | ......................... | 382/228 |
| 2013/0028538 A1* | 1/2013 | Simske et al. | ................ | 382/300 |
| 2013/0034299 A1* | 2/2013 | Lin et al. | ....................... | 382/162 |
| 2013/0034311 A1* | 2/2013 | Lin et al. | ....................... | 382/275 |
| 2013/0034313 A1* | 2/2013 | Lin et al. | ....................... | 382/299 |
| 2013/0064472 A1* | 3/2013 | Zhang et al. | .................. | 382/294 |

\* cited by examiner

*Primary Examiner* — Amir Alavi
(74) *Attorney, Agent, or Firm* — McDermott Will & Emery LLP

(57) ABSTRACT

A machine-implemented method and system for decoding and interpolating the pixel lines of a source image, the method comprising the steps of: storing the plurality of decoded pixel lines in a queue, determining whether the queue contains a sufficient number of decoded pixel lines to perform interpolation between at least two of the decoded pixel lines, and in a case that it is determined that the queue contains a sufficient number of decoded pixel lines to perform interpolation, interpolating at least two of the plurality of decoded pixel lines in the queue to form one or more scaled pixel lines and deleting one or more of the decoded pixel lines in the queue by performing a pop operation on the queue.

20 Claims, 5 Drawing Sheets

US 8,731,338 B1

IMAGE DOWNSCALING

This application claims the benefit of U.S. Provisional Application No. 61/570,268 filed on Dec. 13, 2011, which is hereby incorporated by reference herein.

BACKGROUND

The subject disclosure relates generally to method and system for facilitating image scaling and, in particular, for improving image scaling performance for memory and processing power constrained devices.

In many computing applications it is necessary to downscale images for proper display on small devices. For example, images embedded in web content are frequently downscaled for display on devices having relatively small display screen sizes, such as mobile phones.

Traditionally, image downscaling algorithms function by first decoding an entire original image, then downscaling the entire decoded original image to the desired size. This process requires a memory allocation sufficient to store the decoded original image, in addition to the memory allocated for the downscaled image version. Furthermore, under a traditional downscaling approach, color mapping (e.g., from CMYK or YUV color-space into RGB) is first performed for the original decoded image before downscaling is performed in the RGB color space.

SUMMARY

The disclosed subject matter relates to a machine-implemented method for efficiently downscaling a source image, the method comprising, decoding a plurality of pixel lines of a source image, wherein each of the pixel lines comprises a plurality of pixels; storing the plurality of decoded pixel lines in a queue, determining whether the queue contains a sufficient number of decoded pixel lines to perform interpolation between at least two of the decoded pixel lines, and in a case that it is determined that the queue contains a sufficient number of decoded pixel lines to perform interpolation, interpolating at least two of the plurality of decoded pixel lines in the queue to form one or more scaled pixel lines. In certain aspects, the method may also comprise deleting one or more of the decoded pixel lines in the queue by performing a pop operation on the queue.

The disclosed subject matter also relates to a processor-based system for decoding a plurality of pixel lines of a source image, wherein each of the pixel lines comprises a plurality of pixels, storing the plurality of decoded pixel lines in a queue, determining whether the queue contains a sufficient number of decoded pixel lines to perform interpolation between at least two of the decoded pixel lines, and in a case that it is determined that the queue contains a sufficient number of decoded pixel lines to perform interpolation, interpolating at least two of the plurality of decoded pixel lines in the queue to form one or more scaled pixel lines. In certain aspects, the interpolation comprises horizontally interpolating the at least two of the plurality of decoded pixel lines in the queue and deleting one or more of the decoded pixel lines in the queue by performing a pop operation on the queue.

The disclosed subject matter also relates to a machine-readable medium comprising instructions stored therein, which when executed by a machine, cause the machine to perform operations comprising, decoding a plurality of pixel lines of a source image, storing the plurality of decoded pixel lines in a queue, determining whether the queue contains a sufficient number of decoded pixel lines to perform interpolation between at least two of the decoded pixel lines, and in a case that it is determined that the queue contains a sufficient number of decoded pixel lines to perform interpolation, interpolating at least two of the plurality of decoded pixel lines in the queue to form one or more scaled pixel lines. In certain aspects, the interpolating comprises vertically interpolating the at least two of the plurality of decoded pixel lines in the queue and deleting one or more of the decoded pixel lines in the queue by performing a pop operation on the queue.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be understood as illustrative, and not restrictive in nature.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1:
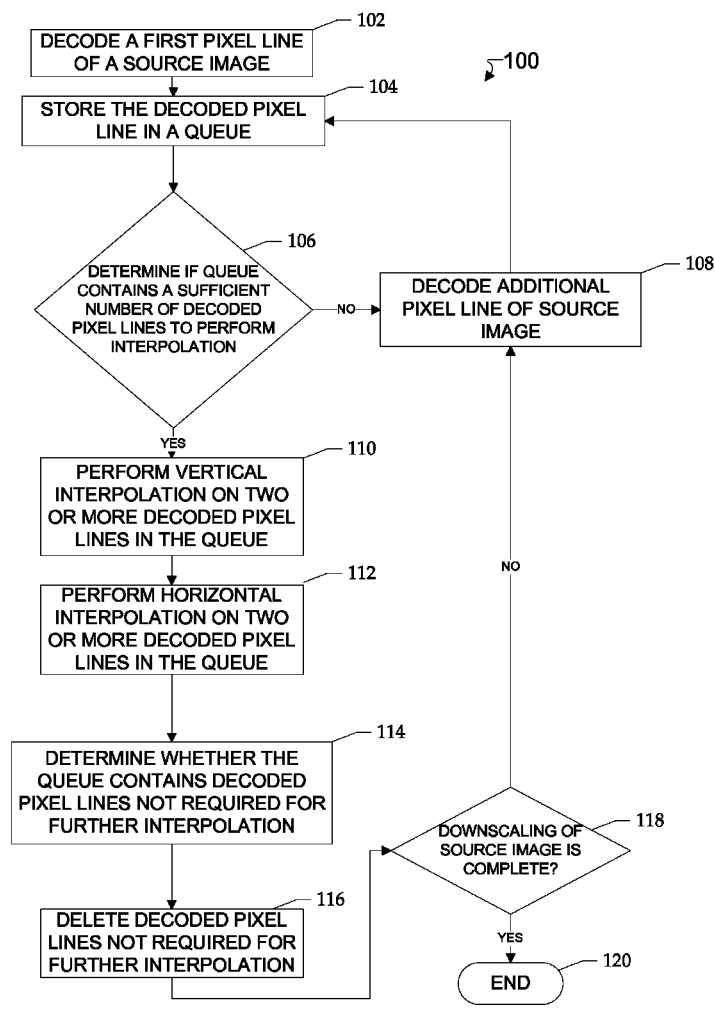
FIG. 1 illustrates a flow diagram of an example method for downscaling a source image.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Because traditional image downscaling methods require the allocation of memory resources sufficient to store the decoded original image in addition to the downscaled image, these methods can potentially use large amounts of memory. For example, downscaling performed on a RGBA image of original size 1920×1080 to 1280×720 typically requires a memory allocation for the total number of decoded pixels ever produced (i.e., 1920×1080×4 to decode the original and 1280×720×4 for the downscaled copy). Additionally, using a traditional image downscaling approach, color mapping from a CMYK or YUV color-space, into an RGB color-space, is first performed on the original decoded image before downscaling is performed.

The disclosed subject matter provides a method and apparatus for use in image downscaling that uses fewer computational and memory resources for a similar downscaling job, with reduced or without any loss in quality. In some aspects, the method is performed by recursively decoding and scaling only portions of the source image and then deleting those decoded portions that will not be needed as processing proceeds. Through multiple iterations, the entire source image can be processed, while minimizing the total memory allocation required to produce a downscaled image version.

For example, a first and a second pixel line of a source image may be decoded and stored to a memory queue. Subsequently, the first and second decoded pixel lines are downscaled through vertical and/or horizontal interpolation, to produce a first scaled pixel line. Next, a third pixel line of the source image is decoded and added to the memory queue. Next, interpolation is performed between the second decoded pixel line and the third decoded pixel line and the first decoded pixel line is deleted from the queue. Interpolation between the second decoded pixel line and the third decoded pixel line produces a second scaled pixel line. This iterative process can be repeated until the entire source image has been processed. Because memory is released with every recursive step (i.e., by popping those decoded pixel lines that are no longer needed) the process minimizes the amount of memory allocated for the downscaling process.

For example, the total memory required for the method of the subject disclosure will typically not exceed the memory allocation for the number of output pixels of the scaled image, plus the memory allocation for the pixels in the queue, given by: ceiling (1/scale factor)×width.

In comparison to the traditional approach described above (i.e., for downscaling a 1920×1080 image to a resolution of 1280×720), the instant procedure improves memory savings by approximately 70%.

Additionally, using a traditional approach, color mapping would be performed for the original decoded image (e.g., the original 1920×1080 image would be mapped into the RGB color space) before downscaling is performed. Thus, color-mapping would be performed on the greatest number of pixels, that is, for each of the pixels of the original image. In contrast, using the process of the instant disclosure, it is possible to only perform color mapping on the downscaled image. Using the above example, only the downscaled 1280×720 image would be mapped into the RGB color space, without first color mapping the original image. By avoiding the mapping of the original image, the process of the subject disclosure uses less computational resources than would be required for the downscaling of an image of comparable size.

FIG. 1 illustrates a example method for the downscaling of a source image according an example aspect. The method 100 begins with step 102 in which a first pixel line of a source image is decoded. In some aspects, the source image may comprise information representing a plurality of pixel lines wherein each pixel line comprises a plurality of pixels. The first decoded pixel line may comprise essentially any pixel line of the source image. In some examples, the first decoded pixel line is a horizontal pixel line chosen from a plurality of horizontal pixel lines, which make up the source image.

In step 104, the decoded pixel line is stored in a queue. As will be discussed in greater detail below, the decoding of step 102 may be performed using one or more processors (e.g., a decoder). Furthermore, the queue storing the pixel line in step 104 may comprise one or more machine-readable, non-transitory memory devices, such as a magnetic, optical or flash memory device.

In step 106, it is determined whether or not the queue contains a sufficient number of decoded pixel lines to perform interpolation. The number of pixels required to perform interpolation can depend on several factors including the desired downscaled image quality and desired scaling speed. In some aspects, a fewer number of pixel lines can be used to perform a downscaling operation using a larger scale factor (e.g., just less than 1). If it is determined that the queue does not contain a sufficient number of pixel lines to perform interpolation, the process proceeds to step 108.

In step 108, one or more additional pixel lines of the source image are decoded and in step 104 the additionally decoded line(s) are stored in the queue with the previously decoded pixel line of step 102. Step 106 is then repeated until it is determined that the queue contains an adequate number of pixels needed to proceed with interpolation.

In step 110, vertical interpolation is performed between two more of the pixel lines in the queue. Subsequently, step 112 is performed wherein the one or more decoded pixel lines in the queue are also horizontally interpolated. The interpolated pixels form one or more scaled pixel lines for storage in a machine-readable memory device.

Proceeding to step 114, it is determined whether or not the queue contains any pixel lines that are not required for further interpolation. Although this determination may be made regarding any decoded pixel lines stored in the queue, in some examples the determination will be made with respect to one or more decoded horizontal pixel lines in the queue. Furthermore, a determination can be made with respect to information stored in the queue representing individual pixels stored therein. As such, in some examples a determination may be made as to whether or not any individual decoded pixels stored in the queue will no longer be required for performing additional interpolation.

If it is determined that all the current pixel information in the queue is required for further interpolation steps, the process proceeds directly to step 118. However, if it is determined that one or more pixels and/or pixel lines in the queue are no longer required for further interpolation, the process proceeds to step 116 in which unnecessary pixels and/or pixel line information is deleted (i.e., popped) from the queue. This recursive deleting process ensures that memory is not allocated for information unnecessary for further processing of the source image.

Subsequently the method 100 proceeds to step 118, in which it is determined if downscaling of the source image is complete. If the determination is made that further decoding and interpolation are required to complete the downscaling process, the method proceeds back to step 108 wherein additional pixel lines of the source image are decoded and pushed to the queue. Alternatively, if it is determined that downscaling is already complete, the method ends with step 120.

Figure 2:
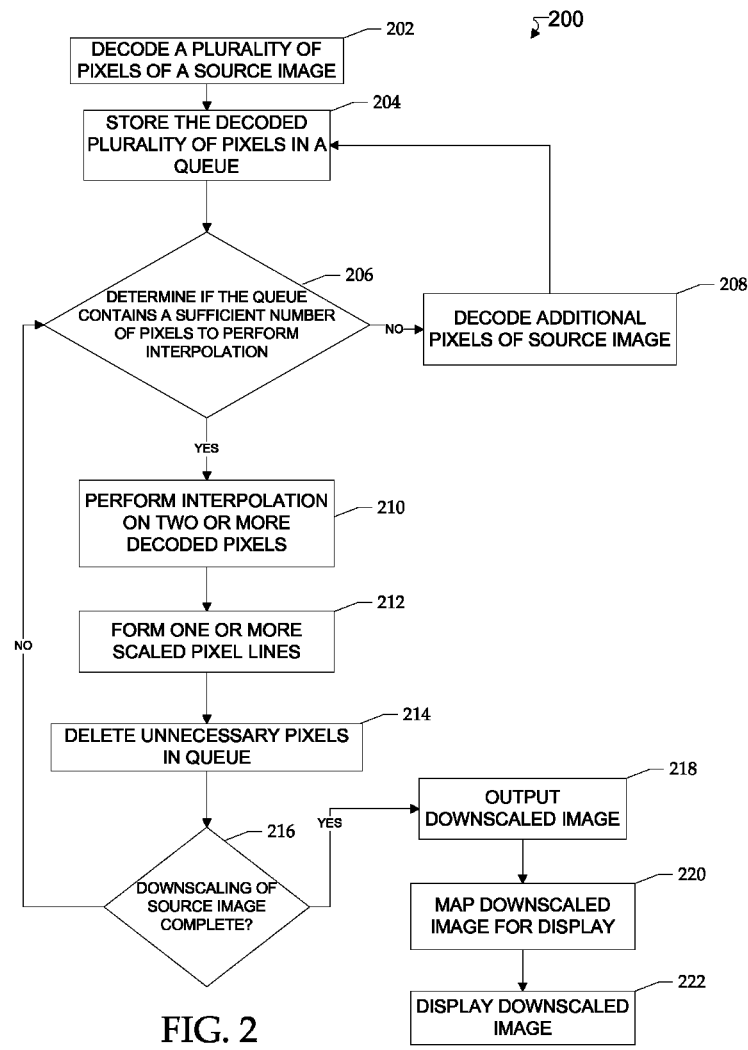
FIG. 2 illustrates a flow diagram of an example process for downscaling a source image and further mapping a downscaled image into a desired color space.

FIG. 2 illustrates an example method for downscaling of a source image and further mapping a downscaled image into a desired color space for display on a display device. The method 200 begins with step 202 in which a plurality of pixels of a source image are decoded. In some aspects, the plurality of pixels may comprise a pixel line, as discussed above with respect to step 102 of the method 100. However, the plurality of pixels of the source image may comprise essentially any pixels of the source image. For example, the plurality of pixels may comprise an entire pixel line (e.g., a horizontal pixel line from among a plurality of horizontal pixel lines that make up the source image) and/or may comprise a portion of a pixel line of the source image.

In step 204, the plurality of decoded pixels are pushed to a queue. As will be discussed in greater detail below with respect to FIG. 4, the decoding of step 202 may be performed using one or more processor(s) and/or decoder(s). Furthermore, the queue storing the plurality of pixels in step 204 may comprise one or more machine-readable, non-transitory memory devices, such as a magnetic, optical or flash memory device.

In step 206, it is determined whether or not the queue contains a sufficient number of pixels to perform interpolation. The total number of pixels required to perform interpolation may depend on the scale factor. For example, a fewer number of pixels may be used to perform a downscaling operation using a relatively large scale factor (for example, a scaling factor just less than 1). If it is determined that the queue does not contain a sufficient number of pixels to perform interpolation, the process proceeds to step 208 in which additional pixels of the source image are decoded and in step 204 are stored in the queue with the previously decoded pixels of step 202. Step 206 is then repeated until it is determined that the queue contains an adequate number of pixels needed to proceed with interpolation.

In step 210 two or more of the decoded pixels in the queue are interpolated. In some implementations, depending on the number of decoded pixels that are interpolated, the scaled output can comprise either more than, or less than, an entire (scaled) pixel line. For example, N decoded pixels in the queue can be interpolated to produce M scaled pixels, where M can be less than a whole scaled pixel line. It should be understood that a fewer number of scaled output pixels will be produced than the number of decoded input pixels that are interpolated. In some examples, the formation of an entire scaled pixel will require interpolation to be performed on one or more full pixel lines from the queue. In some examples, interpolation will performed between two or more whole decoded pixel lines in the queue. For example, two or more decoded pixel lines in the queue could be vertically and/or horizontally interpolated to form one or more scaled output pixel lines, as shown by step 212.

In step 214 unnecessary pixels in the queue will be deleted. As discussed above with respect to step 116 of the method 100, the deletion of one or more pixels in the queue that are not needed for further interpolation may comprise the deleting of one or more pixel lines. For example, the deletion of unnecessary pixels may comprise the deletion of one or more horizontal pixel lines in the queue.

Once unnecessary pixel information has been unloaded (or popped) from the queue, the method 200 proceeds to step 216 in which it is determined if downscaling of the source image is complete. In the case that it is determined that downscaling of the source image is not complete, the process proceeds back to step 206.

However, if it is determined that the downscaling of the source image has completed, the process proceeds to step 218 in which an outputted downscaled image is produced. The image format of the down scaled image may comprise essentially any suitable image format. By way or example, the downscaled image may be rendered in any of the CMYK (cyan, magenta, yellow and key), RGB (red, green, blue), RGBA (red, green, blue, alpha) or YUV color spaces. As will be understood by those of skill in the art, the dimensions of the downscaled image will depend on the scale factor used for downscaling the decoded pixels of the source image (i.e., interpolating the decoded pixels).

In step 220, the downscaled image will be mapped into an appropriate color-space for display. In some examples, the downscaled CMYK image can be mapped into the RGB or RGBA (red, green, blue, alpha) color space. Because color mapping is only performed on the downscaled image, and not on any of the decoded pixels (before interpolation is performed) color mapping is only required for the number of pixels of the output in step 218.

In step 222, the mapped image will be displayed on a display device. As will be discussed in further detail below, the display device may comprise essentially any display for displaying an image to a user. In some examples, the display may be a touch-sensitive display e.g., the display on a processor-based mobile device such as smart phone or personal computer.

Figure 3:
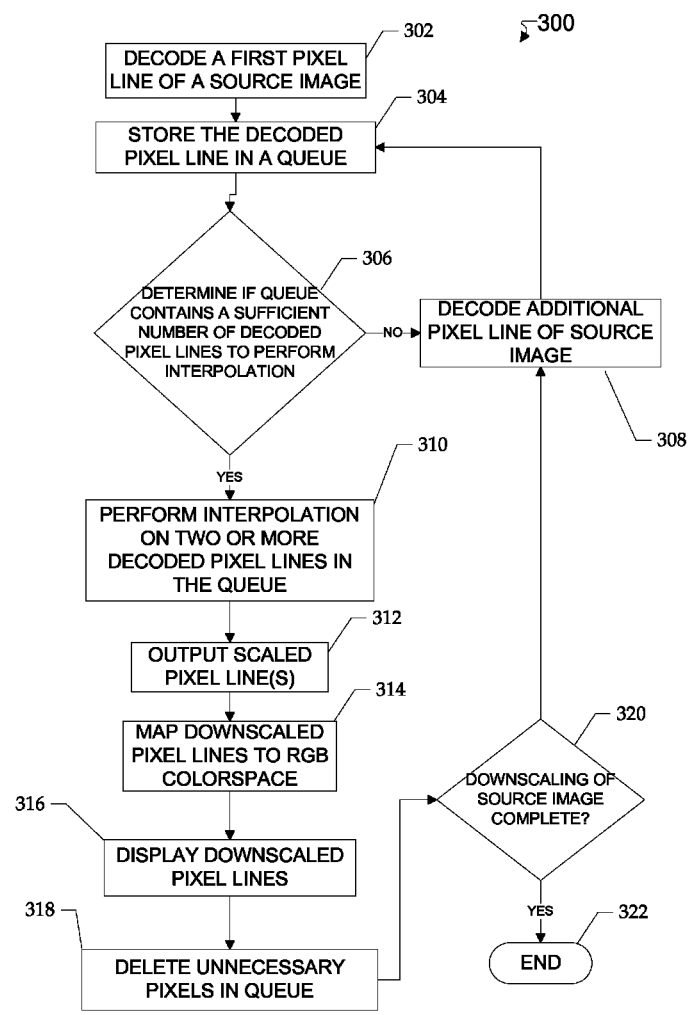
FIG. 3 illustrates a flow diagram of an example process for downscaling pixel lines of a source image and mapping the downscaled pixel lines into a desired color space for display.

FIG. 3 illustrates an example method 300 in which a source image is downscaled and displayed as processing of the source image proceeds. Specifically, the method 300 begins with step 302 in which a first pixel line of a source image is decoded. In some examples, the first decoded pixel line will be a horizontal pixel line chosen from a plurality of horizontal pixel lines which make up the source image. In other examples, the first decoded pixel line may comprise a vertical pixel line chosen from a plurality of pixel lines of the source image.

In step 304 the decoded pixel line is pushed to a queue. The queue used for storing the pixel line may comprise essentially any type of machine-readable, non-transitory memory device. For example, the queue may comprise a magnetic storage media and/or an optical or flash memory device.

In step 306, it is determined whether or not the queue contains a sufficient number of decoded pixel lines to perform interpolation. In some aspects, this determination will be based on various parameters. For example, the determination of step 306 may depend number of pixels (or pixel lines) stored in the queue, the desired scale factor, as well as the desired quality of the downscaled image. If it is determined that the queue does not contain a sufficient number of pixel lines to perform interpolation, the process proceeds to step 308

In step 308, one or more additional pixel lines of the source image are decoded and in step 304 the additionally decoded line(s) are stored in the queue with the previously decoded pixel line of step 302. Step 306 is then repeated until it is determined that the queue contains a sufficient number of pixels needed to proceed with downscaling the source image.

In step 310, the decoded pixel lines in the queue are interpolated. Interpolation may occur between any number of decoded pixel lines in the queue. In some aspects, interpolation will occur for two decoded pixel lines at a time. Furthermore, either vertical or horizontal interpolation between two or more decoded pixel lines may be performed. For example, vertical interpolation may be performed for two decoded horizontal pixel lines; subsequently horizontal interpolation may be performed for the same decoded horizontal pixel lines. However, in some examples, horizontal interpolation may be performed before vertical interpolation.

In step 312 one or more scaled pixel lines are output as a result of the interpolation performed in step 310. The output pixel lines may be stored together in a memory (e.g., a queue) and together may represent a complete downscaled version of the source image. However, in some examples, the one or more output downscaled pixel lines may comprise only a portion of the downscaled source image.

In step 314 the downscaled pixel lines are mapped to a desired color space for display in step 316. In some examples, wherein the downscaled pixel lines comprise the entire downscaled source image, the color mapping will be performed for the entire downscaled image. However, in some examples, wherein the downscaled pixel lines comprise only a portion of the downscaled source image, the color mapping will be performed for only a fraction of the entire downscaled image.

In step 316, the downscaled pixel lines will be displayed on a display device and in step 318 any decoded pixel lines of the source image that are unnecessary for further interpolation, will be deleted from the queue. The procedures of steps 316 and 318 may occur in any order. In step 320, a determination will be made as to whether downscaling of the source image is complete. If it is determined that further processing is required to complete the downscaling, the method 300 will proceed back to step 308. However, if it is determined that downscaling is complete, the method 300 will complete at step 322.

Figure 4:
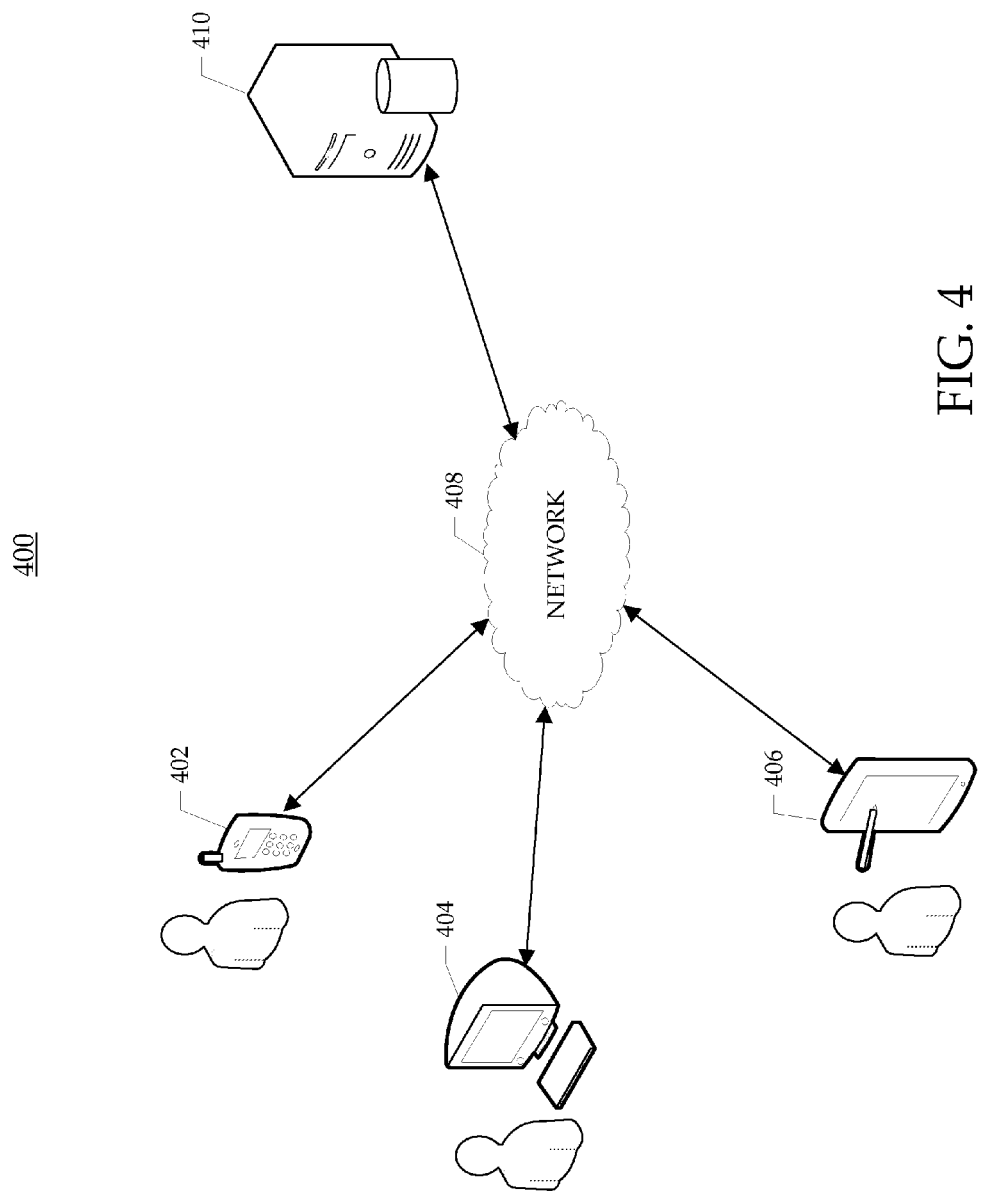
FIG. 4 conceptually illustrates an example of a network system in which some embodiments of the subject technology may be implemented.

FIG. 4 conceptually illustrates an example of a network system in which some embodiments of the subject technology may be implemented. In the example of FIG. 4, electronic device 402 is depicted as a smart phone, electronic device 404 is depicted as a personal computer, and electronic device 406 is depicted as a tablet computing device.

In some aspects, server 410 can be a single computing device such as a computer server. In other embodiments, server 410 can represent more than one computing device working together to perform the actions of a server (e.g., cloud computing). The server 410 may host a web server communicatively coupled to a browser at the client device (e.g., electronic devices 402, 404 or 406) via network 408.

The network 408 can include, for example, any one or more of a wireless telephone network, a wired telephone network and/or a computer network such as a personal area network (PAN), a local area network (LAN), a campus area network (CAN), a metropolitan area network (MAN), a wide area network (WAN), a broadband network (BBN), of the Internet, and the like.

In practice source image data may be received by a client device, e.g., the smart phone 402 and stored on a memory device therein, as discussed below with respect to the system 500. In some examples, a source image will be received via the network 408 and immediately displayed on a display of the client device (e.g., the smart phone 402).

For example, a user using the smart phone 402 may retrieve web content, such as a web page via the server 410 and the network 408. The retrieved content may comprise one or more images for which downscaling would be required for proper display on the smart phone 402. The scale factor required to downscale the received source image to the display of the smart phone 402 (or any processor-based device) may depend on the size of the display area on the smart phone 402 as well as the size of the source image.

Figure 5:
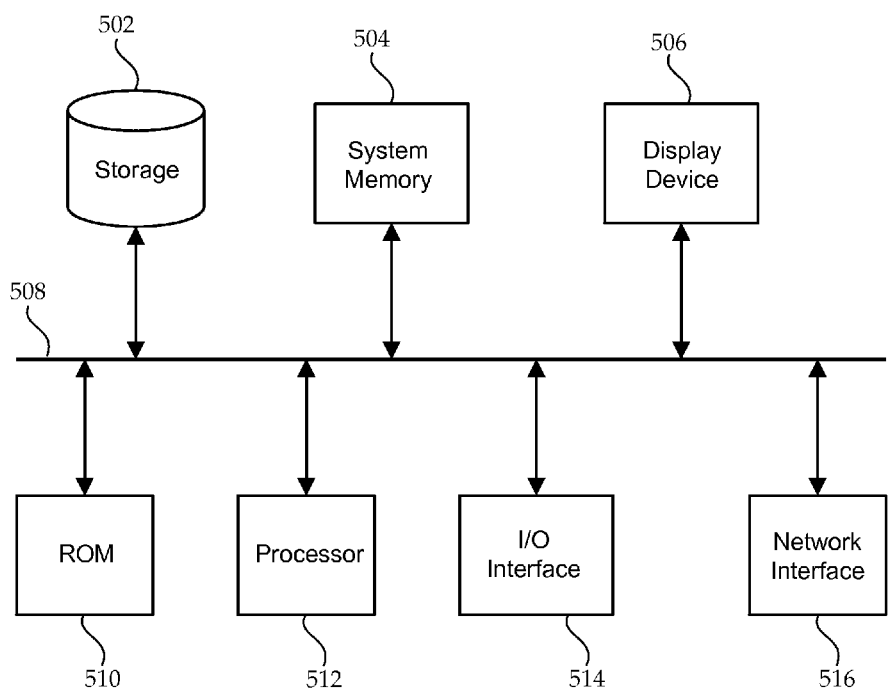
FIG. 5 illustrates an example of processor-based system for carrying out the processes of the subject technology according to some embodiments.

FIG. 5 illustrates an example of processor-based system for carrying out the processes of the subject technology according to some embodiments. In some examples, the processor-based system 500 can be a computing device such as smart-phone, PDA, portable media player, tablet computer, laptop or desktop computer, television or other display with one or more processors coupled thereto or embedded therein, or other appropriate computing devices that can be used for receiving and/or displaying images. The processor-based system 500 comprises storage 502, a system memory 504, display device 506, system bus 508, ROM 510, one or more processor(s) 512, input/output (I/O) interface 514 and a network interface 516.

In some aspects, the system bus 508 collectively represents all system, peripheral, and chipset buses that communicatively connect the numerous internal devices of the processor-based system 500. For instance, system bus 508 communicatively connects the processor(s) 512 with the ROM 510, the system memory 504, the display device 506 and the permanent storage device 502.

From these various memory units, the processor(s) 512 retrieve instructions to execute (and data to process) in order to execute the steps of some aspects of the subject disclosure. The processor(s) 512 can be a single processor or a multi-core processor in different implementations. Additionally, the processor(s) may comprise one or more graphics processing units (GPUs) and/or one or more decoders, depending on implementation.

The ROM 510 stores static data and instructions that are needed by the processor(s) 512 and other modules of the processor-based system 500. Similarly, the processor(s) 512 may comprise one or more memory locations such as a CPU cache or processor in memory (PIM) etc. The storage device 502, is a read-and-write memory device. In some aspects, this device can be a non-volatile memory unit that stores instructions and data even when the processor-based system 500 is without power. Some implementations of the subject disclosure may use a mass-storage device (such as solid state, magnetic or optical storage devices) e.g., a permanent storage device 502.

Other implementations may use a removable storage device (such as a USB or flash drive, and/or an optical disk drive such as a BluRay or DVD) as permanent storage device 502. Although the system memory may be either volatile or non-volatile, in some examples the system memory 504 is a volatile read-and-write memory, such as a random access memory. System memory 504 may store some of the instructions and data that the processor needs at runtime.

In some implementations, the processes of the subject disclosure are stored in system memory 504, permanent storage device 502, ROM 510 and/or one or more on-chip memory locations embedded with one or more of the processor(s) 512. From these various memory units, processor(s) 512 retrieve instructions to execute and data to process in order to execute the processes of some implementations of the instant disclosure.

The bus 508 also connects to the I/O interface 514 and display 506. The I/O interface 514 enables the user to communicate information and select commands to the processor-based system 500. Input devices used with the I/O interface 514 include, for example, alphanumeric keyboards and pointing devices (also called "cursor control devices") and/or wireless devices such as wireless keyboards etc.

The display device 506 enables the display of images (e.g., scaled images generated by the processor-based system 500. The display 506 may comprise essentially any display device. For example, the display 506 may comprise one or more of a touch-based display (e.g., a capacitive touch based display screen), a liquid crystal display (LCD), a light-emitting diode (LED) display etc. In some implementations, a touch-screen may used that functions as both an input and output device.

Finally, as shown in FIG. 5, bus 508 also couples the processor-based system 500 to a network (not shown) through a network interface 516. The network interface 516 may comprise one or more antennas and transceivers. Furthermore, the network interface 516 may be configured for communication with either a wired or wireless network connection. In this manner, the processor-based system 500 can be a part of a network such as a wireless telephone network, or a network of computers, such as a local area network ("LAN"), a wide area network ("WAN"), or a network of networks, such as the Internet.

The network interface 516 may be used for receiving one or more source images to be downscaled and displayed on the display device 506. Furthermore, source image data may be stored on one or more of the storage 502, the system memory 504, the ROM 510 and or processor level memory on one or more of the processor(s) 512. In practice, decoding of source image data can be performed using one or more of the processor(s) 512. Furthermore, storage of the decoded source image data (i.e., in a queue) may be accomplished using one or more of the storage 502, the system memory 504 the ROM 510 and or processor level memory on one or more of the processor(s) 512.

In some example embodiments, processor-based system can be a computing device such as a laptop or desktop computer, smart phone, PDA, portable media player, tablet computer, televisions or other displays with one or more processors coupled thereto or embedded therein, or other appropriate computing devices that can be used to for receiving and displaying one or more downscaled images, such as in the receiving and displaying of a web page or web application.

Many of the above-described features and applications are implemented as software processes that are specified as a set of instructions stored on a readable storage medium (also referred to as computer readable medium). When these instructions are executed by one or more processing unit(s) (e.g., one or more processors, decoders, processor cores, graphics processing units or other processing units etc.), they cause the processing unit(s) to perform the actions indicated in the instructions. Examples of computer readable media include, but are not limited to, flash memory devices, RAM/DRAM chips, magnetic or solid state hard drives, EPROMs, etc. Computer readable media does not include transitory signals such as carrier waves and/or electronic signals passing wirelessly or over wired connections.

Machine executable instructions e.g., a computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, optical media such as read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW), read-only and recordable Blu-Ray® discs, ultra density optical discs etc. Computer-readable media may also include: RAM, ROM, flash memory (e.g., SD cards, mini-SD cards, micro-SD cards, etc.), magnetic and/or solid state hard drives, other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a touch based display, LED (light emitting diode), OLED (organic light emitting diode) and/or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a wireless telephone network, a local area network ("LAN") and a wide area network ("WAN"), an inter-network (e.g., the Internet), and peer-to-peer networks (e.g., ad hoc peer-to-peer networks).

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for downscaling an image, the method comprising:
   decoding a plurality of pixel lines of a source image;
   storing the plurality of decoded pixel lines in a queue;
   determining whether the queue contains a sufficient number of decoded pixel lines to perform interpolation between at least two of the decoded pixel lines, and
   in a case that it is determined that the queue contains a sufficient number of decoded pixel lines to perform interpolation,
      interpolating at least two of the plurality of decoded pixel lines in the queue to form one or more scaled pixel lines; and
      deleting one or more of the decoded pixel lines in the queue by performing a pop operation on the queue.

2. The method of claim 1, wherein in a case that it is determined that the queue does not contain a sufficient number of decoded pixel lines to perform interpolation between at least two of the decoded pixel lines, further comprising the steps of:
   decoding an additional pixel line of the source image; and
   storing the additional decoded pixel line to the queue.

3. The method of claim 1, wherein the step of deleting the one or more of the decoded pixel lines in the queue further comprises:
   determining whether the queue contains one or more decoded pixel lines that are not required for performing further interpolation, and
   in a case that it is determined that the queue contains one or more decoded pixel lines that are not required for performing further interpolation, deleting the one or more decoded pixel lines that are not required for performing further interpolation from the queue.

4. The method of claim 1, further comprising:
   decoding an additional pixel line of the source image; and
   storing the additional decoded pixel line to the queue, wherein the step of interpolating at least two of the plurality of decoded pixel lines in the queue to form one or more scaled pixel lines is repeated until downscaling of the source image is complete.

5. The method of claim 4, further comprising:
   outputting a downscaled image, wherein the downscaled image comprises two or more of the scaled pixel lines.

6. The method of claim 5, further comprising:
   mapping the downscaled image into a RGB color space; and
   displaying the mapped downscaled image on a display.

7. The method of claim 1, further comprising:
   mapping the one or more scaled pixel lines into a RGB color space; and
   displaying the mapped pixel lines on a display.

8. The method of claim 1, wherein the interpolating at least two of the plurality of decoded pixel lines in the queue comprises:
   vertically interpolating the at least two of the plurality of decoded pixel lines in the queue.

9. The method of claim 1, wherein the interpolating at least two of the plurality of decoded pixel lines in the queue comprises:
   horizontally interpolating the at least two of the plurality of decoded pixel lines in the queue.

10. A system for downscaling a source image, the system comprising:
    one or more processors; and
    a machine-readable medium comprising instructions stored thereon, which when executed by the one or more processors, causes the one or more processors to perform operations comprising:
    decoding a plurality of pixel lines of a source image;
    storing the plurality of decoded pixel lines in a queue;
    determining whether the queue contains a sufficient number of decoded pixel lines to perform interpolation between at least two of the decoded pixel lines, and
    in a case that it is determined that the queue contains a sufficient number of decoded pixel lines to perform interpolation,
       interpolating at least two of the plurality of decoded pixel lines in the queue to form one or more scaled pixel lines, wherein the interpolation comprises horizontally interpolating the at least two of the plurality of decoded pixel lines in the queue; and
       deleting one or more of the decoded pixel lines in the queue by performing a pop operation on the queue.

11. The system of claim 10, wherein in a case that it is determined that the queue does not contain a sufficient number of decoded pixel lines to perform interpolation between at least two of the decoded pixel lines, the operations further comprising:

decoding an additional pixel line of the source image; and storing the additional decoded pixel line to the queue.

12. The system of claim 10, wherein the operation of deleting the one or more of the decoded pixel lines in the queue further comprises:
    determining whether the queue contains one or more pixel lines that are not required for performing further interpolation, and
    in a case that it is determined that the queue contains one or more pixel lines that are not required for performing further interpolation, deleting the one or more pixel lines that are not required for performing further interpolation from the queue.

13. The system of claim 10, the operations further comprising:
    decoding an additional pixel line of the source image; and
    storing the additional decoded pixel line to the queue, wherein the operation of interpolating at least two of the plurality of decoded pixel lines in the queue to form one or more scaled pixel lines is repeated until downscaling of the source image is complete.

14. The system of claim 13, the operations further comprising:
    outputting a downscaled image, wherein the downscaled image comprises two or more of the scaled pixel lines.

15. The system of claim 14, the operations further comprising:
    mapping the downscaled image into a RGB color space; and
    displaying the mapped pixel lines on a display.

16. The system of claim 10, the operations further comprising:
    mapping the one or more scaled pixel lines into a RGB color space; and
    displaying the mapped pixel lines on a display.

17. The system of claim 10, wherein the interpolating at least two of the plurality of decoded pixel lines in the queue comprises the operation of:
    vertically interpolating the at least two of the plurality of decoded pixel lines in the queue.

18. A non-transitory machine-readable medium comprising machine-executable instructions stored thereon, which when executed cause the machine to perform the operations comprising:
    decoding a plurality of pixel lines of a source image;
    storing the plurality of decoded pixel lines in a queue;
    determining whether the queue contains a sufficient number of decoded pixel lines to perform interpolation between at least two of the decoded pixel lines, and
    in a case that it is determined that the queue contains a sufficient number of decoded pixel lines to perform interpolation,
        interpolating at least two of the plurality of decoded pixel lines in the queue to form one or more scaled pixel lines, wherein the interpolating comprises vertically interpolating the at least two of the plurality of decoded pixel lines in the queue; and
        deleting one or more of the decoded pixel lines in the queue by performing a pop operation on the queue.

19. The non-transitory machine-readable medium of claim 18, further comprising instructions to perform the operations comprising:
    determining whether the queue contains one or more decoded pixel lines that are not required for performing further interpolation, and
    in a case that it is determined that the queue contains one or more decoded pixel lines that are not required for performing further interpolation, deleting the one or more decoded pixel lines that are not required for performing further interpolation from the queue.

20. The non-transitory machine-readable medium of claim 18, further comprising instructions to perform the operations comprising:
    decoding an additional pixel line of the source image; and
    storing the additional decoded pixel line to the queue, wherein the step of interpolating at least two of the plurality of decoded pixel lines in the queue to form one or more scaled pixel lines is repeated until downscaling of the source image is complete.

* * * * *